United States Patent [19]

Janson

[11] Patent Number: 4,803,972

[45] Date of Patent: Feb. 14, 1989

[54] SOLAR-ENERGY COLLECTOR

[76] Inventor: Gösta Janson, Badvagen 7-9, S-139 00 Varmdo, Sweden

[21] Appl. No.: 142,250

[22] Filed: Jan. 7, 1988

Related U.S. Application Data

[63] Continuation of Ser. No. 918,948, filed as PCT SE86/00034 on Jan. 29, 1986, published as WO86/04669 on Aug. 1, 1986, abandoned.

[30] Foreign Application Priority Data

Feb. 12, 1985 [SE] Sweden ................................ 8500639

[51] Int. Cl.$^4$ ................................................ F24J 2/56
[52] U.S. Cl. .................................................... 126/450
[58] Field of Search ....................... 126/417, 418, 450

[56] References Cited

U.S. PATENT DOCUMENTS

| | | | |
|---|---|---|---|
| 4,055,163 | 10/1977 | Costello et al. | 126/450 X |
| 4,094,301 | 6/1978 | Sorenson et al. | 126/450 X |
| 4,138,991 | 2/1979 | Lorenz | 126/450 |
| 4,186,725 | 2/1980 | Schwartz | 126/418 X |
| 4,261,330 | 4/1981 | Reinisch | 126/418 |
| 4,266,383 | 5/1981 | Krueger et al. | 126/450 X |
| 4,326,503 | 4/1982 | Geier et al. | 126/450 X |
| 4,569,330 | 2/1986 | Pettersson . | |

FOREIGN PATENT DOCUMENTS

| | | |
|---|---|---|
| 2737784 | 3/1979 | Fed. Rep. of Germany . |
| 8301351 | 10/1984 | Sweden . |
| 2099134 | 12/1982 | United Kingdom . |

Primary Examiner—Randall L. Green
Attorney, Agent, or Firm—Sughrue, Mion, Zinn, Macpeck and Seas

[57] ABSTRACT

A solar-energy collector has an absorber (5, 31) located in the bottom of a box-like casing, which includes a cover plate (1) which is permeable to solar radiation. The casing encloses a dry gas, to thereby avoid condensation in the solar-energy collector. The casing is hermetically sealed and contains a constant quantity of gas. The cover plate is movably suspended in a resilient frame (2, 20) which forms part of the casing and which permits movement of the cover plate in a direction perpendicular to the plane thereof in response to changes in gas temperature. This enables harmful pressure variations to be avoided in the collector, and the cover plate rests, well protected, on an elastically resilient cushion of gas.

5 Claims, 2 Drawing Sheets

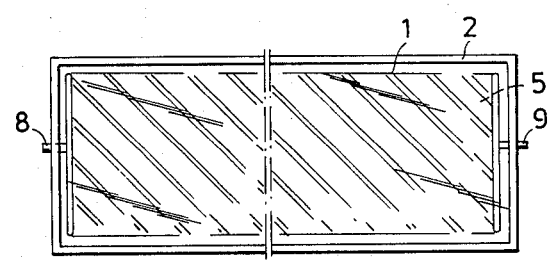
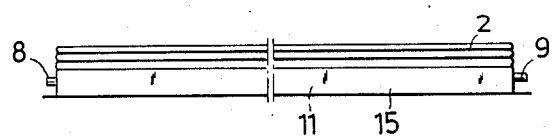
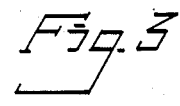
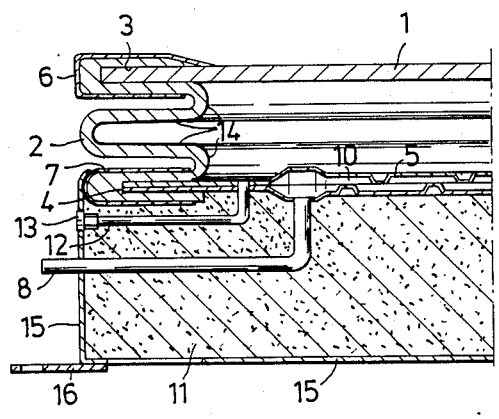
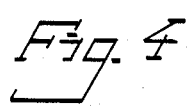
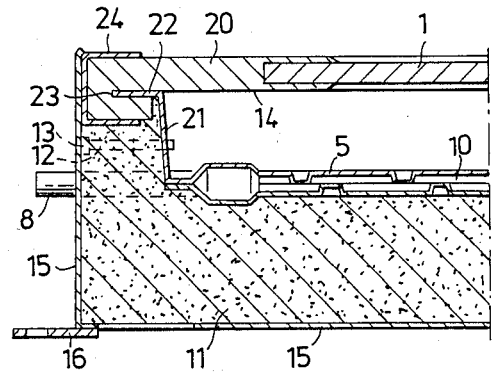

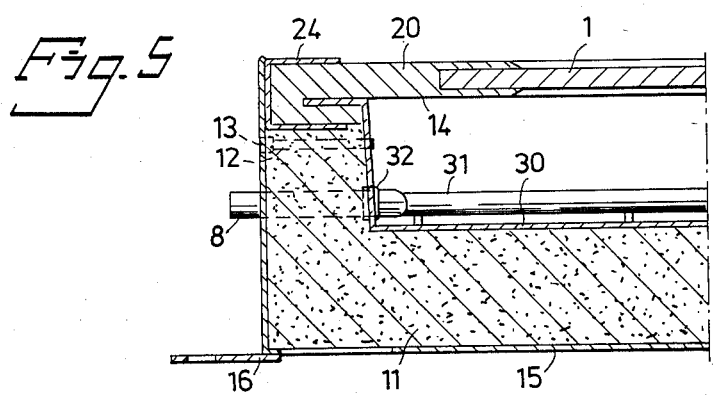
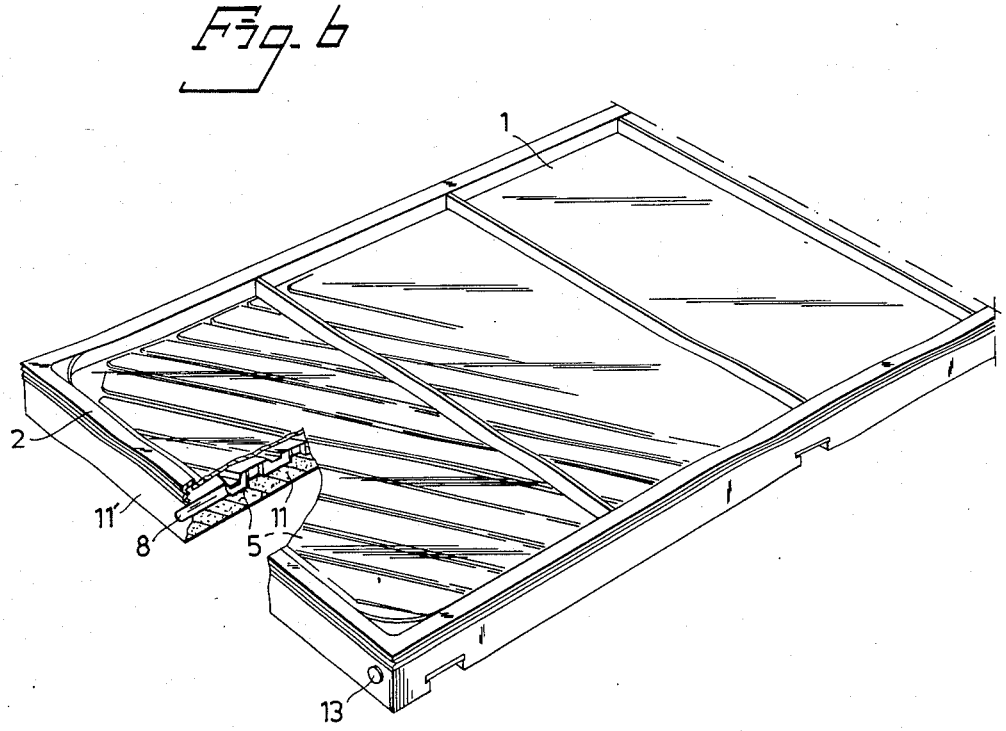

SOLAR-ENERGY COLLECTOR

This is a continuation of application Ser. No. 918,948, filed as PCT SE86/00034 on Jan. 29, 1986, published as WO86/04669 on Aug. 1, 1986, which is abandoned.

BACKGROUND OF THE INVENTION

The present invention relates to a solar-energy collector.

A solar-energy collector of this kind is known from U.S. Pat. No. 4,569,330. A tray-like part of the casing and a cover plate attached to the upper edges of this tray-like part form a box-shaped casing of constant volume enclosing a dry gas. The presence of dry gas prevents condensation forming inside the solar-energy collector. Neither can impurities or harmful substances originating from the insulating material of the solar-energy collector penetrate into the interior thereof. The casing must therefore consist of a material which is proof diffusion, such as sheet steel and glass for example, which is acceptable from the aspect of cost. The dry gas, which may suitably be nitrogen gas, also excludes the risk of corrosion within the solar-energy collector, since the gas guards against oxidation and against the aging of any sealing material or the like which may be present.

The enclosed gas must not be subjected to wide variations in pressure as a result of variations in temperature, in view of the subsequent risk of leakage or of other damage, such as fatigue fracture and the formation of cracks.

This has been avoided in the known solar-energy collector construction, by arranging for the cavity within the collector to communicate with a container located externally of the solar-energy collector and made of a diffusion-proof, light pliable material, such as a bag made of plastic / aluminium-foil laminate for example. The disadvantage with this solution resides in the manual assembly work required, which tends to increase the overall costs, and in that the container, when it is to be placed in a compartment provided therefor in the insulation on the rear side of the casing, takes up a relatively large part of the space intended for the insulation. The volumetric capacity required of the container in order to prevent changes in pressure during filling and subsequent emptying operations is quite considerable, and corresponds to at least 50% of the volume of the box-shaped casing.

SUMMARY OF THE INVENTION

The object of the invention is to provide a solar-energy collector of the kind mentioned in the introduction in which the problem associated with taking up the aforesaid changes in volume is solved without needing to engage in work-requiring manufacturing procedures herefor.

This object is achieved with a solar-energy collector according to the invention having the characterizing features set forth below. Because the casing is hermetically sealed and contains a constant quantity of dry gas, the cover plate will rest on a cushion of gas. When the cover plate is to be proof diffusion, it must consist of glass and should normally then weigh approximately 25 kg. This load is spread over the whole of the surface of the glass plate, thereby enabling the underpart of the solarenergy collector to comprise solely a single block of porous plastic, in the absence of a reinforcing frame or the like, such a frame being necessary in the aforementioned known solar-energy collector for example, the glass plate of which is supported around its edges. Another advantag afforeded by this movable suspension of the cover plate is that it is effectively protected against damage, both during the transportation and handling of the collector and subsequent to its assembly Even extremely heavy blows on the cover plate are readily absorbed without causing damage to the plate, which is able to yield resiliently while resting on the gas cushion in a truly tension-free manner.

As will readily be perceived, the subject of the invention can be manufactured in accordance with assembly-line principles with consummate ease. For example, the absorber can be pressed from steel plates which are then welded together by an automatic welding device in a manner to form the necessary fluid passageways and fluid inlet and outlet. The cover plate, together with the eleastic frame, is fitted to the absorber by clamping the frame around the periphery of the absorber. An adhesive can then be sprayed onto the rear side of the absorber, and the absorber, with frame and cover plate, then placed on a pre-formed block of porous plastic, an upper surface of the block being slightly profiled so as to mate with the adhesivecoated underside of the absorber. The dry gas, e.g. nitrogen gas, is blown into the interior of the casing through a sealable opening provided in the casing, and the frame is locked to the cover plate and the absorber through the agency of clamping strips, in a conventional manner.

BRIEF DESCRIPTION OF THE PREFERRED EMBODIMENTS

The invention will now be described in more detail with reference to a number of embodiments of a solar-energy collector according to the invention illustrated in the accompanying drawings, in which FIG. 1 is a view from above and FIG. 2 is a view from one side of a preferred embodiment taken by way of example;

FIG. 3 is a part-sectional view of the embodiment illustrated in FIGS. 1, 2;

FIGS. 4 and 5 are two similar part-sectional views illustrating two further embodiments of a solar-energy collector according to the invention, and FIG. 6 is a perspective view showing an embodiment similar to that shown in FIGS. 1-3.

DETAILED DESCRIPTION OF THE PREFERRED EMBODIMENTS

The solar-energy collector illustrated in FIGS. 1-3 comprises a glass cover plate 1 surrounded by a bellows-like rubber frame 2, which presents an upper groove 3 for receiving the peripheral edges of the cover plate 1, and a lower groove 4 which receives the peripheral edges of a substantially planar absorber 5. The rubber frame 2 is clamped firmly to the cover plate 1 and the absorber 5 with the aid of stainless-steel clamping strips 6, 7 in a conventional manner. The short ends of the elongate solar-energy collector present inlet and outlet conduits 8, 9, which communicate with passages 10 for fluid present in the absorber, the upper side of which is provided with a selectively treated surface in a conventional manner.

The absorber 5, with the frame 2 and the cover plate 1, rests on a porous plastic block 11, which may be moulded directly onto the undersurface of the absorber 5 or may be pre-formed and suitably profiled on its upper surface to fit against the undersurface of the absorber 5, and bonded thereto with the aid of a suitable adhesive. Located at one or both ends of the absorber 5 is a pipe 12 which communicates with the interior space of the casing defined by elements 1, 2, 5 and which is used to inject the dry gas into the casing, the pipe then being closed with a cap 13.

The inner surfaces of the frame 2 are laminated with aluminium foil 14, to ensure that the frame is truly proof against diffusion.

An advantage is afforded by providing the solar-energy collector with a thin metal-plate housing 15, which surrounds the porous plastic block and extends up to the frame 2, where the edge of the housing 15 is bent in towards the frame. Attachment lugs 16 can then be punched and bent outwardly from the bottom of the housing 15.

Alternatively, the cover plate 1 can be bonded adhesively to a planar, surrounding resilient frame 20 as illustrated in FIG. 4. The absorber 5 is then suitably pressed with an upstanding rim 21, which is terminated with a planar, outwardly extending flange 22 to which the frame 20 is fitted, by means of a groove or channel 23 which receives the flange 22, and a clamping strip 24, which secures the frame 20 to the flange 22.

There are times when an absorber is preferably in the form of a copper pipe. In such cases, there may be provided a tray-shaped plate 30, as illustrated in FIG. 5, on which a planar frame 20 is mounted in the same manner as that illustrated in FIG. 4. The copper pipe 31 of the absorber is attached to the inner surface of the plate 30 and its inlet and outlet conduits pass out through sealed bushings 32 provided in holes in the plate 30.

It will be understood that the illustrated and described embodiments do not limit the invention and that various modifications can be made within the scope of the following claims. For example the resilient frame can be made totally or partially from thin, stainless steel. Moreover, the plastic block 11 may be moulded directly onto the underside of the absorber 5 and the frame 2, as shown in FIG. 6, by means of a mould, not shown, giving rise to a hard waterimpervious surface 11' (casting skin) that needs no metal-plate housing. Further, the absorber 5 can consist of a set of solar cells for generating electricity.

I claim:

1. A solar energy collector, comprising:
   (a) a tray-like casing having a planar bottom wall and relatively low side walls upstanding therefrom,
   (b) a generally planar energy absorber unit (5 31) disposed within the casing overlying the bottom wall thereof,
   (c) a planar, substantially rigid cover plate (1) pervious to solar radiation and disposed overlying the energy absorber unit, and
   (d) resilient, gas impervious, suspension mounting and sealing means (2 20) forming a part of the casing and extending continuously between an outer peripheral edge portion of the cover plate to which a peripheral edge portion of said suspension mounting and sealing means is sealingly joined, and a surrounding edge portion of the side walls to define, in cooperation with the cover plate, a hermetically sealed chamber, a dry gas, preferably nitrogen, filling said sealed chamber said peripheral edge portion of said suspension mounting and sealing means together with said peripheral edge of the cover plate being free and unrestrained against movement perpendicular to the plane of the cover plate, and said means being configured to enable substantial bi-directional movement of said cover plate perpendicular to the plane thereof without any deflection of said cover plate to compensate, without any significant gas pressure change, for volumetric expansions and contractions of the dry gas within the chamber due to temperature changes.

2. A solar energy collector according to claim 1, wherein the suspension mounting and sealing means comprises a bellows member (2) extending upwardly from said edge portion of the side walls, a lower edge of the bellows member being sealingly joind to said edge portion of the side walls and an upper edge of the bellows member being sealingly joined to said outer peripheral edge of the cover plate.

3. A solar energy collector according to claim 1, wherein the suspension mounting and sealing means comprises a planar frame member (20) having an outer peripheral edge sealingly joined to an upper edge of an upstanding edge portion of said side walls and an inner peripheral edge sealingly joined to said outer peripheral edge portion of the cover plate, said frame member having a width substantially greater than a thickness thereof and extending inwardly over the casing bottom wall and being coplanar therewith.

4. A solar energy collector according to claims 1, 2 or 3, wherein the absorber unit (5) is integrated with a bottom portion of the casing, which has an inner surface selectively treated for the absorption of solar energy.

5. A solar-energy collector according to claim 4, wherein the resilient suspension mounting and sealing means (2, 20) is made of rubber and has a layer (14) of diffusion-proof material on the inside thereof.

* * * * *